(12) United States Patent
Kuno et al.

(10) Patent No.: US 7,784,764 B2
(45) Date of Patent: *Aug. 31, 2010

(54) LOW-ADHESION MATERIAL, MOLD FOR MOLDING RESIN USING THE SAME AND CONTAMINANT ADHESION PREVENTING MATERIAL

(75) Inventors: Takaki Kuno, Kyoto (JP); Yoshinori Noguchi, Kyoto (JP); Keiji Maeda, Kyoto (JP); Seiichi Suda, Nagoya (JP); Satoshi Kitaoka, Nagoya (JP); Naoki Kawashima, Nagoya (JP); Masato Yoshiya, Nagoya (JP)

(73) Assignees: Towa Corporation, Kyoto (JP); Japan Fine Ceramics Center, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/262,897

(22) Filed: Nov. 1, 2005

(65) Prior Publication Data
US 2006/0093693 A1    May 4, 2006

(30) Foreign Application Priority Data
Nov. 2, 2004    (JP)    ............................. 2004-318910

(51) Int. Cl.
B29C 33/38    (2006.01)
B32B 3/24    (2006.01)

(52) U.S. Cl. ...................... 249/115; 249/135; 106/38.2; 428/469; 428/623; 428/629

(58) Field of Classification Search ................. 249/134, 249/111, 114.1–116, 127, 135; 425/542, 425/812; 264/219, 293; 106/38.22, 38.2; 428/408, 472.2, 469, 629, 622, 471, 623; 73/150 A
See application file for complete search history.

(56) References Cited

U.S. PATENT DOCUMENTS

| 3,297,296 A | * | 1/1967 | Edstrom et al. | ............. 249/197 |
| 3,804,566 A | * | 4/1974 | Kimura et al. | ............. 425/28.1 |
| 4,217,261 A | * | 8/1980 | Sekmakas et al. | ........... 523/402 |
| 4,740,246 A | * | 4/1988 | Feagin | .................... 106/38.22 |

(Continued)

FOREIGN PATENT DOCUMENTS

EP    713248 A2    *    5/1996

(Continued)

OTHER PUBLICATIONS

Translation of JP 2004-25677.*

(Continued)

*Primary Examiner*—Philip C Tucker
*Assistant Examiner*—Dimple N Bodawala
(74) *Attorney, Agent, or Firm*—Birch, Stewart, Kolasch & Birch, LLP

(57) ABSTRACT

A low-adhesion material containing a rare-earth element is formed as a layer or a film on a mold surface of a mold for molding a resin. A main component of the low-adhesion material is a rare-earth compound, and $Y_2O_3$ is used as an example. A content of the rare-earth compound in the low-adhesion material is not less than 40 percent by volume. Thereby, a mold for molding a resin having excellent releasability can be obtained.

11 Claims, 2 Drawing Sheets

U.S. PATENT DOCUMENTS

| | | | | |
|---|---|---|---|---|
| 4,863,990 | A * | 9/1989 | Chiou et al. | 524/517 |
| 5,246,787 | A * | 9/1993 | Schulz et al. | 428/629 |
| 5,423,904 | A * | 6/1995 | Dasgupta | 96/146 |
| 5,481,795 | A * | 1/1996 | Hatakeyama et al. | 29/852 |
| 5,535,811 | A * | 7/1996 | Feagin | 164/139 |
| 5,698,015 | A * | 12/1997 | Mohri et al. | 252/512 |
| 5,827,613 | A * | 10/1998 | Nakayama et al. | 428/408 |
| 6,174,614 | B1 * | 1/2001 | Yushio et al. | 428/698 |
| 6,244,870 | B1 * | 6/2001 | Sakata et al. | 433/213 |
| 6,403,510 | B1 * | 6/2002 | Kuibira et al. | 501/98.5 |
| 6,479,763 | B1 * | 11/2002 | Igaki et al. | 174/262 |
| 6,619,368 | B1 * | 9/2003 | Springgate et al. | 164/4.1 |
| 7,407,146 | B2 * | 8/2008 | Kuno et al. | 249/115 |
| 2004/0253334 | A1 * | 12/2004 | Bandoh et al. | 425/117 |
| 2005/0154113 | A1 * | 7/2005 | Kuno et al. | 524/430 |
| 2005/0285287 | A1 * | 12/2005 | Okumura et al. | 264/2.5 |
| 2006/0093693 | A1 | 5/2006 | Kuno et al. | |
| 2006/0131784 | A1 * | 6/2006 | Sugimoto | 264/293 |
| 2006/0286346 | A1 * | 12/2006 | Kuno et al. | 428/137 |
| 2008/0254286 | A1 * | 10/2008 | Kuno et al. | 428/352 |

FOREIGN PATENT DOCUMENTS

| | | | |
|---|---|---|---|
| EP | 1452812 A1 * | 9/2004 | |
| EP | 1498401 A2 * | 1/2005 | |
| JP | 60-168613 A | 9/1985 | |
| JP | 1-166911 A | 6/1989 | |
| JP | 04149074 A * | 5/1992 | |
| JP | 04164859 A * | 6/1992 | |
| JP | 4-211912 A | 8/1992 | |
| JP | 7-329099 A | 12/1995 | |
| JP | 07329099 A * | 12/1995 | |
| JP | 08192438 A * | 7/1996 | |
| JP | 9-1562 | 1/1997 | |
| JP | 10-34669 A | 2/1998 | |
| JP | 2000001366 A * | 1/2000 | |
| JP | 2000109374 A * | 4/2000 | |
| JP | 2000128624 A * | 5/2000 | |
| JP | 2000-159619 A | 6/2000 | |
| JP | 2003137670 A * | 5/2003 | |
| JP | 2004-25677 A | 1/2004 | |
| JP | 2004025677 A * | 1/2004 | |
| JP | 2004146556 A * | 5/2004 | |
| JP | 2004250251 A * | 9/2004 | |
| JP | 2005-274478 A | 10/2005 | |
| JP | 2005-280200 A | 10/2005 | |
| TW | 200633782 | 10/2006 | |
| WO | WO 9923047 A1 * | 5/1999 | |

OTHER PUBLICATIONS

Electrical property of Ceramics.*

* cited by examiner

LOW-ADHESION MATERIAL, MOLD FOR MOLDING RESIN USING THE SAME AND CONTAMINANT ADHESION PREVENTING MATERIAL

This nonprovisional application is based on Japanese Patent Application No. 2004-318910 filed with the Japan Patent Office on Nov. 2, 2004, the entire contents of which are hereby incorporated by reference.

BACKGROUND OF THE INVENTION

1. Field of the Invention

The present invention relates to a material having a low adhesion property with respect to an organic substance (hereinafter will be referred to as a "low-adhesion material"), and a mold for molding a resin in which at least a mold surface is made of the low-adhesion material.

2. Description of the Background Art

Conventionally, transfer molding or injection molding has been used for molding a resin. These techniques use a mold for molding a resin having a resin flow channel and a cavity. To mold a resin, a fluid resin is injected into the cavity through the resin flow channel. Thereafter, the injected fluid resin is cured, and a molded body having the cured resin is completed.

In the method of molding a resin described above, it is common that a thermosetting resin is used as a material for the fluid resin, and tool steel is used as a material for the mold for molding a resin. When these materials are used, an adhesion property between the cured resin and the surface of the mold for molding a resin (mold surface) should be reduced for easy removal of the molded body from the mold. In other words, releasability between the cured resin and the mold surface should be improved.

For example, an organic material such as polytetrafluoroethylene or silicone rubber having a good non-wetting (dewetting) characteristic with respect to a fluid resin, that is, a bad wetting characteristic with respect to a fluid resin, is considered to be promising as a material improving releasability between a mold for molding a resin and a cured resin. It is to be noted that, in the present specification, having a good non-wetting characteristic means that a contact angle between a solid mold and a liquid fluid resin is large. For example, Japanese Patent Laying-Open No. 07-329099 proposes on page 3 to page 4 a method of coating a mold with such an organic material by spraying or applying the organic material onto a mold surface and then drying the organic material. According to the document, a mold for molding a resin having an excellent releasability is achieved to a certain degree.

In a case where a chip-type electronic component such as an LSI (Large Scale Integration) chip mounted on a lead frame, a printed board, or the like (hereinafter will simply be referred to as a "chip") is sealed with a resin, a thermosetting resin containing a ceramic filler, for example, an epoxy resin is used as a fluid resin. Since the filler wears a mold surface, a metal-based material with high hardness having wear resistance is formed on the mold surface. For example, a method is used in which a mold surface is coated with a metal-based material with high hardness excellent in wear resistance such as Cr, TiC, or CrN, by means of plating, PVD (Physical Vapor Deposition), CVD (Chemical Vapor Deposition), or the like.

Further, for example Japanese Patent Laying-Open No. 2004-25677 proposes on page 5 to page 6 and in FIGS. 1 and 2 a resin molding method in which a mold for molding a resin made of a porous material having a three-dimensional communicating hole is used and a gas component contained in a fluid resin is emitted during resin molding out of the mold through the communicating hole.

However, according to the aforementioned conventional technique, a cured resin is likely to stick to a mold surface, and thus there are problems as described below.

Firstly, in order to remove the cured resin as a contaminant such as a resin residue, the mold surface should be cleaned periodically. That makes resin molding operation complicated.

Secondly, numerous eject mechanisms are required to remove a molded body from the mold. Thus, the mold becomes larger and has a complicated structure.

Thirdly, when the mold surface is coated with an organic material such as polytetrafluoroethylene or silicone rubber, these organic materials are likely to be worn by a filler contained in the fluid resin. Therefore, it is practically difficult to use these organic materials singly as a material for improving releasability of the mold.

Fourthly, when the mold surface is coated with a metal-based material with high hardness excellent in wear resistance such as Cr, TiC, or CrN, releasability between the metal-based material and the mold surface is insufficient because these metal-based materials do not have a sufficient non-wetting characteristic with respect to a fluid resin.

That is to say, there exists no mold for molding a resin having a low adhesion property between a mold surface and an organic substance constituting a resin and also having the mold surface made of an appropriate material which can be used practically, including a mold for molding a resin having a mold surface made of a porous material.

The present invention has been made in view of the aforementioned problems, and one object of the present invention is to provide a low-adhesion material having a low adhesion property between an organic substance and a surface of the material. Another object of the present invention is to provide a mold for molding a resin having excellent releasability.

SUMMARY OF THE INVENTION

A low-adhesion material of the present invention contains at least a rare-earth element having a low adhesion property with respect to an organic substance. Thereby, a material having a lower adhesion property with respect to an organic substance than that of a conventional material can be achieved. If the low-adhesion material contains a rare-earth compound as at least one main component, sufficient releasability with respect to a resin can be obtained. The rare-earth compound may be an oxide as a simple substance, a nitride as a simple substance, a carbide as a simple substance, and a mixture containing at least two of an oxide, a nitride, and a carbide. Further, if the oxide is $Y_2O_3$, availability of a material for forming the low-adhesion material is enhanced. Sufficient releasability with respect to a resin can also be obtained when a content of the rare-earth compound is not less than 40 percent by volume.

Further, if the low-adhesion material has porousness, a gas component discharged from the organic substance is emitted outside via the low-adhesion material when the low-adhesion material and the organic substance are brought into contact, and weight reduction in the low-adhesion material can be achieved.

Furthermore, if the low-adhesion material has conductivity, the low-adhesion material can generate heat when current flows to the low-adhesion material.

A mold for molding a resin of the present invention is a mold in which a fluid resin filled into a cavity is cured to form a cured resin, and at least a portion including a mold surface of the mold for molding a resin is made of a low-adhesion material containing a rare-earth element. Thereby, a mold for molding a resin having excellent releasability can be obtained.

Preferably, the low-adhesion material used in the mold for molding a resin has a characteristic similar to that of the low-adhesion material of the present invention described above.

For example, if the mold for molding a resin has porousness, a gas component contained in the fluid resin is emitted outside via the mold for molding a resin. This can prevent a void from remaining in a molded body made of the cured resin. Further, the molded body can be ejected by means of a method of emitting high-pressure gas from an opening in the mold surface to the molded body. Furthermore, weight reduction in the mold for molding a resin can be achieved.

Further, if the mold for molding a resin has conductivity, the resin can be melted or cured by means of a method of flowing current to the mold for molding a resin to allow the resin molded body to generate heat.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
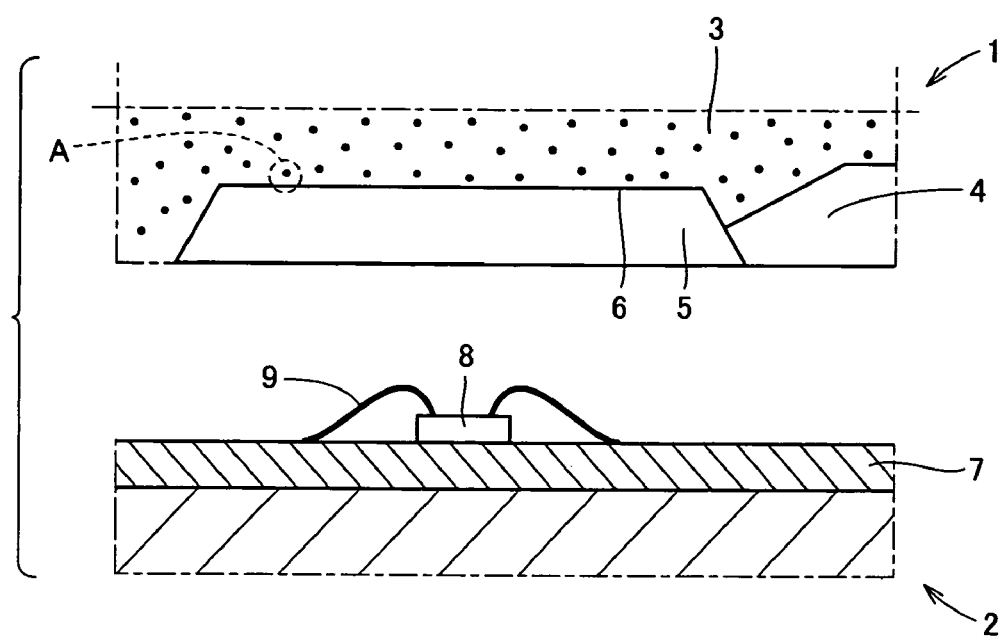
FIG. 1 is a cross sectional view showing a mold for molding a resin in a second embodiment.

Firstly, referring to Table 1, explanation will be given on a method of evaluating an adhesion property between an organic substance and a surface of a material as well as a low-adhesion material in a first embodiment of the present invention which has been found using the evaluation method. Table 1 illustrates relationship between a material which comes into contact with an organic substance and adhesion strength (adhesion property) between the organic substance and the material as a result of the evaluation by the evaluation method described above. In this evaluation, a cured resin formed by curing a fluid resin is employed as an organic substance.

TABLE 1

| Sample | Adhesion Strength (MPa) |
| --- | --- |
| $Al_2O_3$ | 13.356 |
| 4YSZ | 11.580 |
| SKD-11 (mirror finished) | 4.517 |
| $Yb_2O_3$ | 0.135 |
| $Er_2O_3$ | 0.131 |
| $Y_2O_3$ | 0.088 |
| $Sm_2O_3$ | 0.807 |

The adhesion strength described above was measured by an experiment which will be described below. Firstly, a cylinder-shaped material having an outer diameter of $\phi 13.585$ mm was prepared; and an end surface of the material was mirror polished. Next, the material was fit into a mold for molding a resin ($\phi 13.6$ mm), and an epoxy-based solid resin material was fit into a pot of the mold for molding a resin. Thereafter, the mold for molding a resin was closed, and the solid resin material was melted under a predetermined pressure (10 MPa) at a predetermined temperature. After a lapse of a predetermined time period, the melted resin material was cured within the mold for molding a resin.

Next, a tensile test was performed on a molded body in which the cured resin obtained through the above steps and the material stuck together. Thereafter, a tensile load when an interface between the cured resin and the material had been separated was divided by a cross sectional area of the interface to calculate a value of adhesion strength between the cured resin and the material. The experiment was performed using each of the seven types of the materials, and the adhesion strength shown in Table 1 was calculated for each material.

In the evaluation method described above, taking a possibility of practical use into consideration, an upper limit value of the adhesion strength is determined at 2 MPa in order to obtain required high releasability. Therefore, the material shown in Table 1 is evaluated to have the required releasability if its adhesion strength is not more than 2 MPa.

It has been found from Table 1 that the materials having the adhesion strength of not more than 2 MPa include $Yb_2O_3$ (0.135), $Er_2O_3$ (0.131), $Y_2O_3$ (0.088), and $Sm_2O_3$ (0.807). Note that the number within the parenthesis represents a value of the adhesion strength (unit: MPa) obtained by the experiment.

That is, of the seven materials described above, $Y_2O_3$, $Er_2O_3$, $Yb_2O_3$, and $Sm_2O_3$ are suitable as a material forming the mold surface. In particular, taking availability, cost, and the like into consideration in addition to a low adhesion property, $Y_2O_3$ is most suitable as a low-adhesion material forming the mold surface.

It is understood that any of these four materials is a substance containing a rare-earth element, more strictly speaking, an oxide of a rare-earth element. Therefore, it has been found as desirable to use a substance containing a rear-earth element, specifically, an oxide of a rare-earth element or a mixture of a plurality of rare-earth elements as the low-adhesion material.

On the other hand, although 4YSZ (a stabilized $ZrO_2$ containing 4 mol of $Y_2O_3$) is a substance containing an oxide of a rare-earth element ($Y_2O_3$), it does not have a sufficiently low adhesion property. This means that a target adhesion property is not obtained when a content of an oxide of a rare-earth element ($Y_2O_3$) is low. It is considered that the reason why the target adhesion property is not obtained in 4YSZ is that the content of $Y_2O_3$ is low since it is just added to 4YSZ as a stabilizer. Therefore, the content of an oxide of a rare-earth element (for example $Y_2O_3$) is preferably set to a value which allows the rare-earth element to be at least one of main components. Specifically, the content is preferably not less than 40 percent by volume.

Examples of the substance containing a rare-earth element include a substance made of one type of a rare-earth element, a mixture of plural types of rare-earth elements, a substance made of one type of a rare-earth compound, and a mixture of plural types of rare-earth compounds. Further, examples of the substance containing a rare-earth element include a mixture of the substances described above, and a mixture having at least one of the substances described above and a substance not containing a rare-earth element.

It is to be noted that the term "percent by volume" used herein refers to a value calculated based on a theoretical density determined by the composition of substances of a rare-earth compound and a material other than that. The theoretical density is a density under the assumption that atoms in a material are ideally arranged, and is determined based on a lattice constant and chemical composition. In other words, the theoretical density is a density of a solid itself not including a void (JIS R 1600). According to the Dictionary of Chemistry 3, compact edition, the 28th printing, Kyoritsu Publishing, 1984, page 895, for example $Y_2O_3$ has a theoretical density value of 4.84 $g/cm^3$.

Next, explanation will be given on a method of manufacturing a low-adhesion material in the present embodiment.

Firstly, powder of a predetermined oxide, for example powder of $Y_2O_3$ is prepared as a material. Next, the powder of $Y_2O_3$ is molded under a predetermined pressure, using a mold for forming a predetermined shape. By using the mold in an appropriate shape in this step, a low-adhesion material having a concave portion corresponding to a resin flow channel and a cavity, for example a resin flow channel 4 and a cavity 5 shown in FIGS. 1 and 2, can be manufactured.

Next, the molded mixture is molded by pressure, using CIP (Cold Isostatic Pressing). Then, the mixture molded by pressure is sintered at a predetermined temperature for a predetermined period of time. Through the steps so far, a sintered compact of $Y_2O_3$, which is an oxide of a rare-earth element, is obtained. The sintered material may further be sintered by pressure, using HP (Hot Press) or HIP (Hot Isostatic Pressing), in order to enhance relative density of the sintered material.

Although the upper limit value of the adhesion strength to achieve the required high releasability is determined at 2 MPa taking the possibility of practical use into consideration in the above description, this upper limit value may be changed as appropriate depending on such as the purpose of determining the upper limit value, the application of the low-adhesion material, or the characteristic of the cured resin. For example, any of a value greater than 2 MPa and a value of not more than 2 MPa may be an upper limit value, and a material having an adhesion strength within a range defined by an upper limit value and a lower limit value may be used.

Further, although it has been described that an oxide of a rare-earth element and a mixture thereof may be used as the low-adhesion material in the above description, a substance which will be described below may be used if it has an adhesion strength required of the low-adhesion material.

For example, a substance made of one type of a rare-earth element, or a mixture of plural types of rare-earth elements may be used. Further, a rare-earth compound other than an oxide, for example, a rare-earth nitride, a rare-earth carbide, or a mixture of plural types of rare-earth compounds may be used. Furthermore, a mixture containing at least two of a rare-earth oxide, a rare-earth nitride, and a rare-earth carbide may be used. A mixture of a substance containing a rare-earth element and a substance not containing a rare-earth element may also be used. That is to say, the low-adhesion material can be any material containing at least a rare-earth element.

However, the material described above should satisfy the requirement that a content of a rare-earth compound is set to a value which allows the rare-earth compound to be one of main components of the low-adhesion material, specifically, the content is not less than 40 percent by volume, regardless of whether the material is a simple substance or a mixture. Further, it is also required that a content of a rare-earth element is not less than a predetermined value.

Second Embodiment

Figure 2:
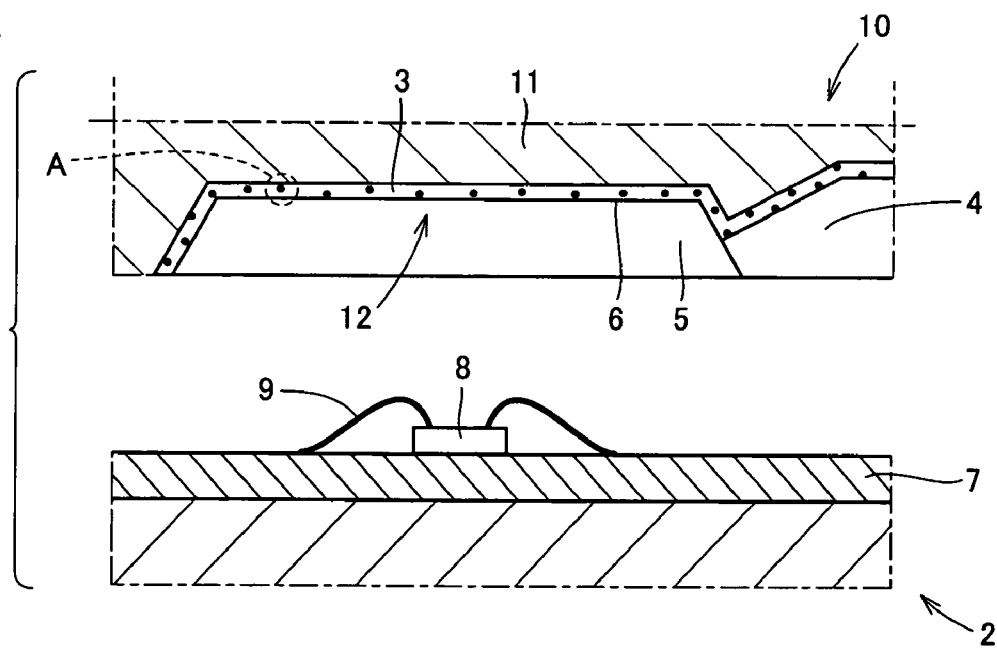
FIG. 2 is a cross sectional view showing a modification of the mold for molding a resin shown in FIG. 1.

Next, referring to FIGS. 1 and 2, a mold for molding a resin in a second embodiment of the present invention will be described. Both of FIGS. 1 and 2 are exaggerated for ease of illustration. In the present embodiment, transfer molding is used as a resin molding method. Further, a method of sealing a chip mounted on a substrate with a resin is used.

In the resin sealing in the present embodiment, firstly, a chip electrically connected to a substrate by a wire is accommodated in a cavity and, with the mold closed, the cavity is filled with a fluid resin. Thereafter, the fluid resin is cured to form a cured resin, and thus a molded body (package) having the substrate and the cured resin is completed.

An upper mold 1 and a lower mold 2 shown in FIGS. 1 and 2 constitute a mold for molding a resin. Further, upper mold 1 corresponds to the mold for molding a resin in the present invention. That is, upper mold 1 is formed of a material with high releasability 3 made of the low-adhesion material of the present invention. Upper mold 1 is provided with a resin flow channel 4 through which the fluid resin (not shown) flows, and a cavity 5 to be filled with the fluid resin. Accordingly, material with high releasability 3 is exposed at surfaces of resin flow channel 4 and cavity 5, that is, a mold surface 6 of the mold for molding a resin with which the fluid resin comes into contact.

On the other hand, lower mold 2 is formed of such as tool steel, on which a lead frame, a printed substrate 7, and the like are placed. A chip 8 is mounted on substrate 7, and electrodes (not shown) of substrate 7 and chip 8 are electrically connected by a wire 9.

Next, explanation will be given on operation of the mold for molding a resin shown in FIGS. 1 and 2. Firstly, substrate 7 is placed on lower mold 2, and then substrate 7 is fixed to lower mold 2 by means of absorption or the like. Next, upper mold 1 is lowered, and thus closing of upper mold 1 and lower mold 2 is completed. Thereafter, the fluid resin made of a thermosetting resin and having a predetermined viscosity is pushed by a plunger (not shown), and thus the fluid resin is injected into cavity 5 through resin flow channel 4. Next, the fluid resin is heated by a heater (not shown) provided in upper mold 1 and lower mold 2, and then cured to form the cured resin. Next, upper mold 1 is raised for opening the mold, and thereafter a molded product is taken out. In the molded product, substrate 7, chip 8, and wire 9 are sealed with the cured resin in a unified manner.

The mold for molding a resin in the present embodiment has a characteristic that upper mold 1 of the mold for molding a resin which comes into contact with the fluid resin is formed of material with high releasability 3 made of the low-adhesion material described in the first embodiment. Specifically, mold surface 6 of upper mold 1 with which the fluid resin comes into contact is formed of material with high releasability 3. Further, as described above, material with high releasability 3 has an excellent low adhesion property with respect to the cured resin formed by curing the fluid resin, and is a chemically stable substance. The low adhesion property provides excellent releasability with respect to the cured resin, a property that a contaminant made of the cured resin is hard to stick to the mold surface, and a property that the contaminant stuck to the mold surface is easily removed. Therefore, according to the mold for molding a resin in the present embodiment, an eject mechanism is not required, excellent releasability is maintained for long period of time, and frequency of cleaning is reduced.

Further, since ceramics made of an oxide such as $Y_2O_3$ has excellent wear resistance, the problem regarding the wear of an organic material caused when using a mold for molding a resin having a mold surface coated with the organic material does not occur. Furthermore, in comparison to a mold for molding a resin in which the mold surface is coated with a metal-based material such as Cr, Tic, or CrN, a mold for molding a resin excellent in releasability is achieved.

The mold for molding a resin in the present embodiment is manufactured by performing processing on the low-adhesion material in a predetermined shape described in the first embodiment. Further, if a more precise shape is required, precision processing by cutting may be provided on the low-adhesion material in a block shape. By means of a technique as described above, upper mold 1 shown in FIG. 1 is completed.

Next, referring to FIG. 2, explanation will be given on a modification of the mold for molding a resin shown in FIG. 1. An upper mold 10 shown in FIG. 2 is a mold for molding a resin in the present invention. In upper mold 10, a mold main body 11 made of a conventional material such as tool steel is used, and a mold-releasing layer 12 made of the low-adhesion material of the present invention is formed on a surface of mold main body 11 as a layer or a film. Mold-releasing layer 12 is formed by a well-known technique such as burning of a sheet-like material, vacuum evaporation, electronic beam evaporation, PVD, CVD, sputtering, plasma spraying, or ion plating. According to the mold for molding a resin in the modification, since mold-releasing layer 12 is formed on mold surface 6, an effect similar to that obtained by the mold for molding a resin shown in FIG. 1 can be obtained.

Low-adhesion material 3 of the present embodiment is satisfactory as long as it is formed to constitute at least mold surface 6. In other words, it is satisfactory if the low-adhesion material of the first embodiment, specifically a material having a content of a rare-earth compound of not less than 40 percent by volume, is formed to constitute at least mold surface 6. Thereby, excellent low adhesion property, that is, high releasability with respect to the cured resin is achieved in mold surface 6. It is to be noted that mold main body 11 may be made of ceramics instead of a metal material.

Third Embodiment

Figure 3:
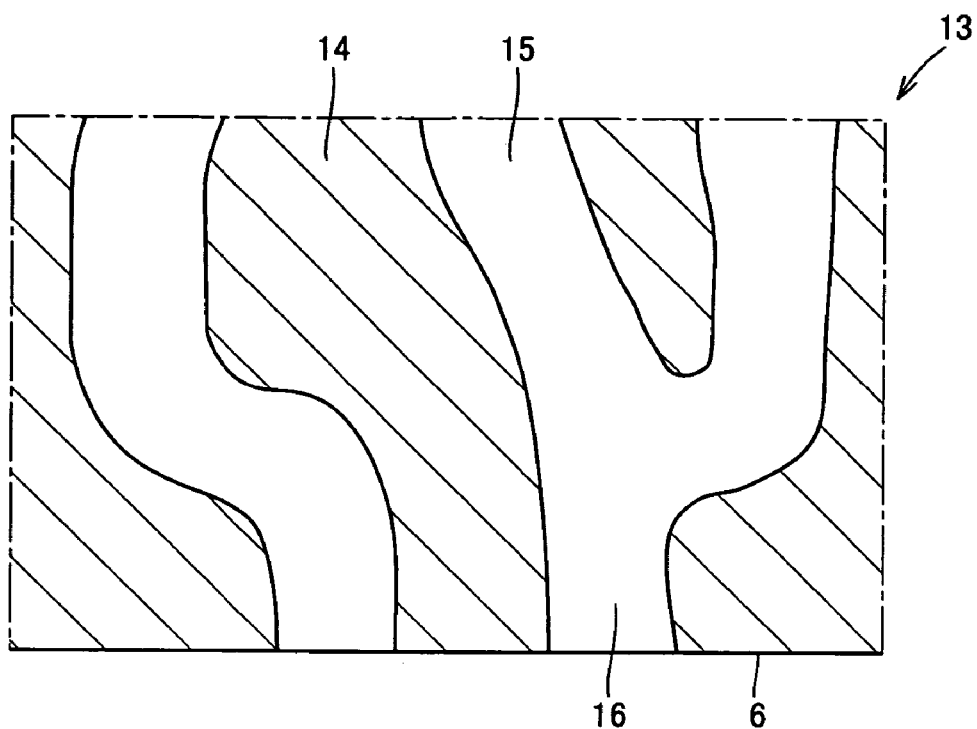
FIG. 3 is an enlarged cross sectional view showing the proximity of a mold surface of a mold for molding a resin in a third embodiment.

Next, referring to FIG. 3, explanation will be given on a low-adhesion material and a mold for molding a resin in a third embodiment of the present invention. Both of FIGS. 3 and 4 correspond to enlarged cross sectional views of a part A in FIG. 2. The mold for molding a resin in the present embodiment has a characteristic that the low-adhesion material constituting a mold surface has porousness. As shown in FIG. 3, a low-adhesion material 13 in the present embodiment has a base material 14 made of the low-adhesion material described in the first embodiment, in which a three-dimensional communicating hole 15 having an average diameter of 10 nm to 1000 nm is formed. With the presence of communicating hole 15, an opening 16 having an average diameter of 10 nm to 1000 nm are formed in mold surface 6. The average diameter of communicating hole 15 is determined to allow passage of a gas component (including water vapor) contained in the cavity and the fluid resin but not to allow passage of a component other than a gas component, such as a particle of the fluid resin.

In the mold for molding a resin in the present embodiment, low-adhesion material 13 shown in FIG. 3 is used as material with high releasability 3 shown in FIG. 2. Further, mold main body 11 of the mold for molding a resin shown in FIG. 2 is made of a material having three-dimensional porousness, specifically, a metal material, ceramics, or the like having numerous three-dimensional communicating holes. Therefore, in addition to the effect that releasability between the molded body and mold surface 6 is excellent as in the mold for molding a resin in the second embodiment, effects as will be described below can also be obtained.

Firstly, since the gas component contained in the fluid resin is emitted through communicating hole 15, voids in the molded body are reduced. This effect can be enhanced further remarkably by vacuuming the space in resin flow channel 4 and cavity 5 after closing upper mold 1 shown in FIG. 1 or upper mold 10 shown in FIG. 2 and lower mold 2. Secondly, if compressed air and the like are emitted from opening 16 in mold surface 6 into resin flow channel 4 and cavity 5 shown in FIG. 2, the molded body can surely be ejected from mold surface 6. Thirdly, weight reduction in the low-adhesion material and the mold for molding a resin can be achieved.

Next, explanation will be given on a modification of the low-adhesion material shown in FIG. 3.

A low-adhesion material 17 in the modification has a characteristic that a conductive layer 18 which can generate heat when current flows therethrough is formed on an inner wall of communicating hole 15. Since such low-adhesion material 17 is used in the mold for molding a resin, the mold itself can generate heat. Specifically, by flowing current directly to low-adhesion material 17 using a power source, Joule heat can be generated in conductive layer 18 formed on the inner wall of communicating hole 15. It is also possible to utilize the conductivity of low-adhesion material 17 to allow conductive layer 18 to generate heat by means of IH (Induction Heating).

Figure 4:
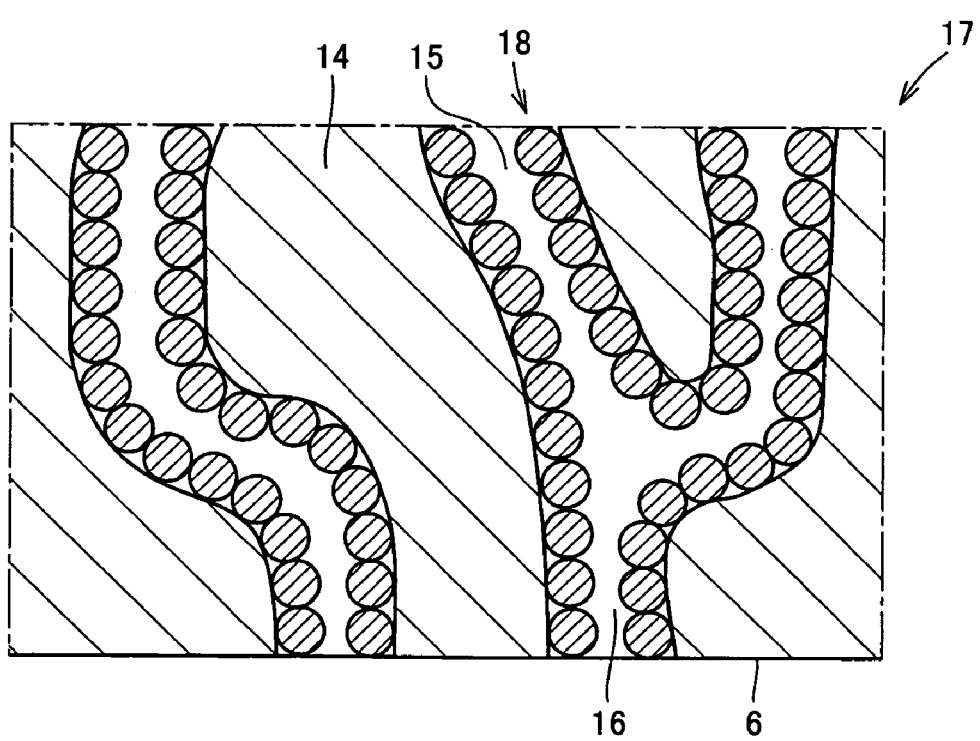
FIG. 4 is an enlarged cross sectional view showing a modification of the proximity of a mold surface of the mold for molding a resin shown in FIG. 3.

In the mold for molding a resin in the modification, low-adhesion material 17 shown in FIG. 4 is used as material with high releasability 3 in FIG. 2. Further, when the mold for molding a resin shown in FIG. 2 is used, mold main body 11 is made of a material having three-dimensional porousness, specifically, a metal material, ceramics, or the like having numerous three-dimensional communicating holes.

Next, brief explanation will be given on a method of manufacturing low-adhesion material 17 having porousness and conductivity.

Firstly, a material in which oxide particles and carbon particles have been mixed at a predetermined ratio is prepared, and then the material is mixed by ball milling. Next, a mixture made of the mixed material is subjected to vibrated-fluidized drying. Thereafter, the dried mixture is processed to have a uniform particle size using a screen with an appropriate mesh.

Next, the mixture having uniform-sized particles is molded using a mold for forming the mixture in a predetermined shape. Thereafter, the molded mixture is molded by pressure by means of CIP. Then, the mixture molded by pressure is sintered at a predetermined temperature for a predetermined period of time. In the present modification, the mixture is burned in a condition in which an atmosphere within a burning furnace has a reduced pressure, that is, in a so-called vacuum condition.

Next, sintered low-adhesion material 17 is taken out from the burning furnace. Thereby, low-adhesion material 17 having a desired shape as well as porousness and conductivity is completed. If a mold for molding a resin in a more precise shape is required, low-adhesion material 17 may be subjected to precision processing by means of such as electrical discharge machining utilizing its conductivity, cutting, or the like. Thereby, for example upper mold 1 shown in FIG. 2 is completed.

According to the method of manufacturing low-adhesion material 17 described above, in the step of burning the mixture in a vacuum condition, CO gas generated by carbon reduction reaction is emitted from the material. Thereby, a path of the CO gas emission remains as communicating hole 15 having a uniform and minute diameter in the sintered compact after the burning, that is, low-adhesion material 17. Communicating holes 15 having a uniform diameter of not more than 1000 nm are formed with being dispersed uniformly in low-adhesion material 17. Further, on the inner wall of each communicating hole 15, a carbide, which is a conductive substance, is generated as a layer or a series of particles, and the carbide constitutes conductive layer 18. Furthermore, of the oxide which is a component of the material, a portion which has not reacted with carbon is sintered to be a sintered compact having a predetermined strength.

The sintered compact serves as a frame portion in low-adhesive material 17, that is, base material 14. Therefore, according to the present modification, base material 14 having a predetermined strength, communicating holes 15 having a uniform diameter and uniformly dispersed, and conductive layer 18 produced on the inner wall of communicating hole 15 are formed in the same process.

Low-adhesion material 17 can be manufactured with a change in the mixing ratio of oxide particles and carbon particles, the particle size of each material, the burning condition, and the like. Thereby, the average diameter of communicating hole 15 and resistivity, permiability, porosity, and compression strength of low-adhesion material 17 as a whole can be changed, and thus it becomes possible to manufacture low-adhesion material 17 having a different specification.

According to the present modification, in addition to an effect similar to that obtained by low-adhesion material 13 shown in FIG. 3, effects as will be described below can also be obtained.

Firstly, since the mold for molding a resin (upper mold 1 shown in FIG. 2) itself can generate heat, it becomes possible to increase the temperature of the mold for molding a resin to reach a predetermined temperature in a short period of time and with less energy. Therefore, energy consumed for resin molding can be reduced.

Secondly, although a component made of an organic substance may adhere to mold surface 6 and the inner wall of communicating hole 15 after resin molding is performed continuously, the adhering matter can readily be removed by heat. The adhering matter can be removed by heat by allowing the mold for molding a resin itself to generate heat to reach an evaporating temperature of the adhering matter on mold surface 6 and the inner wall of communicating hole 15. Thereby, the adhering matter is dissolved and removed, and thus occurrence of clogging of communicating hole 15 can be prevented.

Further, in the present modification, a protective film made of an inorganic material such as a glass-based material or a ceramics-based material, or an organic material such as a silicone-based resin or a fluorine-based resin may be formed as appropriate on the surface of low-adhesion material 17, that is, on mold surface 6, such that opening 16 of communicating hole 15 is not closed. The protective film not only has a function as an insulating film, but also has a function of protecting mold surface 6, a function of suppressing thermal conduction from low-adhesion material 17 to another member to enhance efficiency of heat generation, and a function of improving releasability between the cured resin and the mold surface.

Although explanation has been given on the mold for molding a resin used when chip 8 mounted on substrate 7 is sealed with a resin in the second and the third embodiments of the embodiments described above, the mold for molding a resin of the present invention is not limited to the aforementioned mold for molding a resin, and may be applied to any mold used when a fluid resin injected into cavity 5 is cured to manufacture a molded body as in a mold for molding a resin used in transfer molding, injection molding, or other similar common techniques.

Further, although transfer molding is used in the second and the third embodiments, the method of using the mold for molding a resin of the present invention is not limited to transfer molding, and may be applied to any resin molding method in which a fluid resin is injected into cavity 5, mold closing is performed, and then the fluid resin is cured to form a cured resin. For example, the mold for molding a resin of the present invention can also be used in a resin molding method in which cavity 5 is filled with a fluid resin using potting, or a method in which a solid resin material supplied to cavity 5 is melted to fill cavity 5 with a fluid resin and then a mold is closed (compression molding).

Furthermore, although entire mold surface 6 of the mold for molding a resin with which the fluid resin comes into contact is made of a material with high releasability in the second and the third embodiments, the mold for molding a resin of the present invention is not limited to the one described above, and only a portion of mold surface 6 with which the fluid resin comes into contact, for example the inner bottom surface in cavity 5 (the upper surface in FIG. 2), may be made of a material with high releasability.

Further, although the low-adhesion material of the present invention is used for the mold for molding a resin, the low-adhesion material of the present invention is not limited to the one described above used in the mold for molding a resin, and may be used as a member other than a member of the mold for molding a resin, that is, as a member of a device which requires a low wetting characteristic with respect to a fluid resin. Specifically, the low-adhesion material of the present invention may be used in such as a coating material for a portion of a duct or the like with which a fluid resin comes into contact.

Furthermore, the low-adhesion material of the present invention may be used as a material for a portion which requires a low adhesion property with respect to an organic substance other than a fluid resin and a cured resin. For example, the low-adhesion material of the present invention may be used as a material having a function of preventing adhesion of a contaminant made of an organic substance. Specifically, the low-adhesion material of the present invention may be used as a material for a building material used for such as an outer wall of a building, a bathtub, sanitary chinaware, or other similar equipment. The low-adhesion material of the present invention may also be used as a material for coating the surface of a material used for these applications.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A low-adhesion material containing a rare-earth compound having a low adhesion property with respect to an organic substance, wherein said low-adhesion material contains not less than 40% by volume of said rare-earth compound, wherein said low-adhesion material has a plurality of communicating holes, and a conductive layer of carbide is formed on and along an inner wall of each of said plurality of communicating holes.

2. The low-adhesion material according to claim 1, wherein said rare-earth compound is an oxide, a nitride, a carbide, or a mixture containing at least two of an oxide, a nitride, and a carbide.

3. The low-adhesion material according to claim 2, wherein said oxide is at least one of $Yb_2O_3$, $Er_2O_3$, $Y_2O_3$, and $Sm_2O_3$.

4. A mold for molding a resin in which a fluid resin filled into a cavity is cured to form a cured resin, wherein at least a portion including a mold surface of said mold for molding a resin and to be in contact with said cured resin is made of a low-adhesion material containing a rare-earth compound, wherein said low-adhesion material contains not less than 40% by volume of said rare-earth compound, wherein said low-adhesion material has a plurality of communicating holes, and a conductive layer of carbide is formed on and along an inner wall of each of said plurality of communicating holes.

5. The mold for molding a resin according to claim 4, wherein said rare-earth compound is an oxide, a nitride, a carbide, or a mixture containing at least two of an oxide, a nitride, and a carbide.

6. The mold for molding a resin according to claim 5, wherein said oxide is at least one of $Yb_2O_3$, $Er_2O_3$, $Y_2O_3$, and $Sm_2O_3$.

7. The mold for molding a resin according to claim 4, wherein the portion including said mold surface has porousness.

8. The mold for molding a resin according to claim 4, wherein the portion including said mold surface has conductivity.

9. A contaminant adhesion preventing material having a function of preventing adhesion of a contaminant made of an organic substance and containing a rare-earth compound having a low adhesion property with respect to an organic substance, wherein said low-adhesion material contains not less than 40% by volume of said rare-earth compound, wherein said low-adhesion material has a plurality of communicating holes, and a conductive layer of carbide is formed on and along an inner wall of each of said plurality of communicating holes.

10. The contaminant adhesion preventing material according to claim 9, wherein said rare-earth compound is an oxide as, a nitride a carbide, or a mixture containing at least two of an oxide, a nitride, and a carbide.

11. The contaminant adhesion preventing material according to claim 10, wherein said oxide is at least one of $Yb_2O_3$, $Er_2O_3$, $Y_2O_3$, and $Sm_2O_3$.

* * * * *